United States Patent
Harigae

(10) Patent No.: US 7,593,127 B2
(45) Date of Patent: Sep. 22, 2009

(54) IMAGE FORMING APPARATUS AND DATA OVERWRITING METHOD

(75) Inventor: Makoto Harigae, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 853 days.

(21) Appl. No.: 10/743,536

(22) Filed: Dec. 23, 2003

(65) Prior Publication Data
US 2005/0134916 A1  Jun. 23, 2005

(51) Int. Cl.
*G06F 15/00* (2006.01)
*G06F 15/16* (2006.01)

(52) U.S. Cl. ...................... 358/1.16; 709/206

(58) Field of Classification Search .............. 358/1.16, 358/1.15, 1.13, 1.14, 1.18, 402; 709/201, 709/203, 206, 223, 250; 396/3; 348/586; 719/310; 235/375, 494, 380, 435, 383; 705/26–27, 705/51–52
See application file for complete search history.

(56) References Cited

U.S. PATENT DOCUMENTS

| | | | |
|---|---|---|---|
| 2002/0143924 A1* | 10/2002 | Iga | 709/223 |
| 2002/0144005 A1* | 10/2002 | Mae et al. | 709/310 |
| 2003/0086122 A1* | 5/2003 | Parry | 358/402 |

FOREIGN PATENT DOCUMENTS

JP  9-224107 A  8/1997

* cited by examiner

*Primary Examiner*—Saeid Ebrahimi Dehkordy
(74) *Attorney, Agent, or Firm*—Foley & Lardner LLP

(57) ABSTRACT

At the time of start of a reboot operation or a boot operation of an image forming apparatus, a system processing section confirms whether a configuration of an option processing section has changed, and whether data in storage devices in processing sections has changed. If the image forming apparatus fails to normally operate due to a combination of changed data, the system processing section overwrites data in the storage devices in the respective processing sections, with use of data stored in an external storage device, thereby realizing a latest, optimal combination of data.

13 Claims, 2 Drawing Sheets

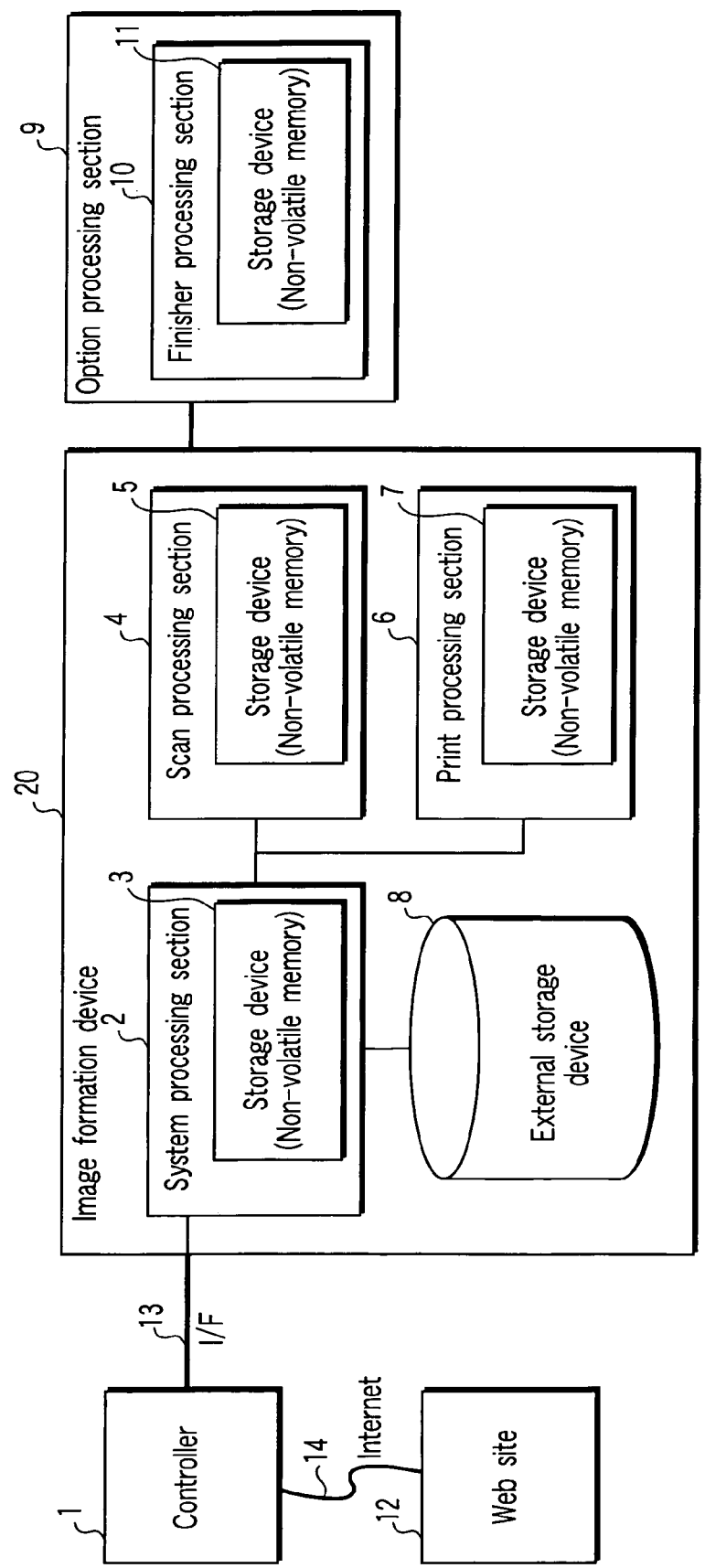
F I G. 1

IMAGE FORMING APPARATUS AND DATA OVERWRITING METHOD

BACKGROUND OF THE INVENTION

The present invention relates to an image forming apparatus, which can execute data overwrite by receiving data from outside, and to a data overwriting method.

In the prior art, when data overwrite is performed in an image forming apparatus, a controller first compares the version of data, which is stored in a storage device in a processing section of the image forming apparatus, with the version of data for the storage device in the processing section, which is located on a Web site. When the version of the data on the Web site is a later one, the controller acquires the data from the Web site and delivers it to the image forming apparatus. In the image forming apparatus, the data in the storage device of the associated processing section is overwritten.

In the controller or the image forming apparatus, data in storage devices in respective processing sections is overwritten in succession. For example, data in a system processing section is first overwritten, data in a scan processing section is secondly overwritten, data in a print processing section is thirdly overwritten, and data in a finisher processing section is fourthly overwritten.

In this overwrite method, however, if data overwrite fails during the data overwrite operation, or if power is disrupted during the data overwrite, there would be such cases that data is lost and normal operation cannot be started even if the apparatus is rebooted or power is turned on again.

In addition, when specific data is overwritten, mismatching would occur in data between respective processing sections and there would be such cases that normal operations cannot be started even if the apparatus is rebooted or power is turned on again.

In particular, when the configuration of an option processing section, which is associated with a device connected to the image forming apparatus, is altered, normal operations cannot be performed in many cases. For example, a communication error occurs due to mismatching of data between respective processing sections.

BRIEF SUMMARY OF THE INVENTION

The object of an aspect of the present invention is to provide an image forming apparatus and a data overwriting method, which can prevent mismatching of data between respective processing sections due to failure of data overwrite, disruption of power during data overwrite, a change after data overwrite or a change in a device included in the image forming apparatus.

According to an aspect of the present invention, there is provided an image forming apparatus capable of receiving data from outside and executing data overwrite, comprising: a plurality of processing sections that include storage devices storing data associated with the respective sections of the image forming apparatus, and executes control based on the data stored in the storage devices; a storage section that stores basic data and overwrite data thereof, which is stored in the storage devices of the processing sections; a receiving section that receives overwrite data from the outside; a first control section that executes a control to store the data received by the receiving section in the storage section; an overwrite section that overwrites the data in the storage device of the associated processing section, using the data received by the receiving section; a confirming section that confirms whether the image forming apparatus operates with a combination of the data stored in the storage devices immediately after the overwrite section overwrites the data or immediately after power to the apparatus is turned on; and a second control section that executes, when the confirming section confirms that the image forming apparatus fails to operate, a control to overwrite the data in the storage devices on the basis of the basic data and overwrite data stored in the storage section, thereby to realize a latest, optimal combination of data.

According to another aspect of the present invention, there is provided a data overwriting method for an image forming apparatus capable of receiving data from outside and executing data overwrite, comprising: controlling respective sections, which form the image forming apparatus, on the basis of data stored in storage devices associated with the respective sections; storing basic data and overwrite data thereof, which is stored in the storage devices, into an external storage device; executing, when overwrite data is received from the outside, a control to store the received data in the external storage device; overwriting the data in the associated storage device, using the received data; confirming whether the image forming apparatus operates with a combination of the data stored in the storage devices immediately after the data is overwritten or immediately after power to the apparatus is turned on; and executing, when it is confirmed that the image forming apparatus fails to operate, a control to overwrite the data in the storage devices on the basis of the basic data and overwrite data stored in the external storage device, thereby to realize a latest, optimal combination of data.

Additional objects and advantages of an aspect of the invention will be set forth in the description which follows, and in part will be obvious from the description, or may be learned by practice of the invention. The objects and advantages of an aspect of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of an aspect of the invention.

FIG. 1 is a block diagram schematically showing the structure of an image forming apparatus according to the present invention;

FIG. 3 is a flow chart illustrating a reboot operation immediately after overwrite of specific data or a boot operation immediately after power is turned on.

DETAILED DESCRIPTION OF THE INVENTION

Figure 2:
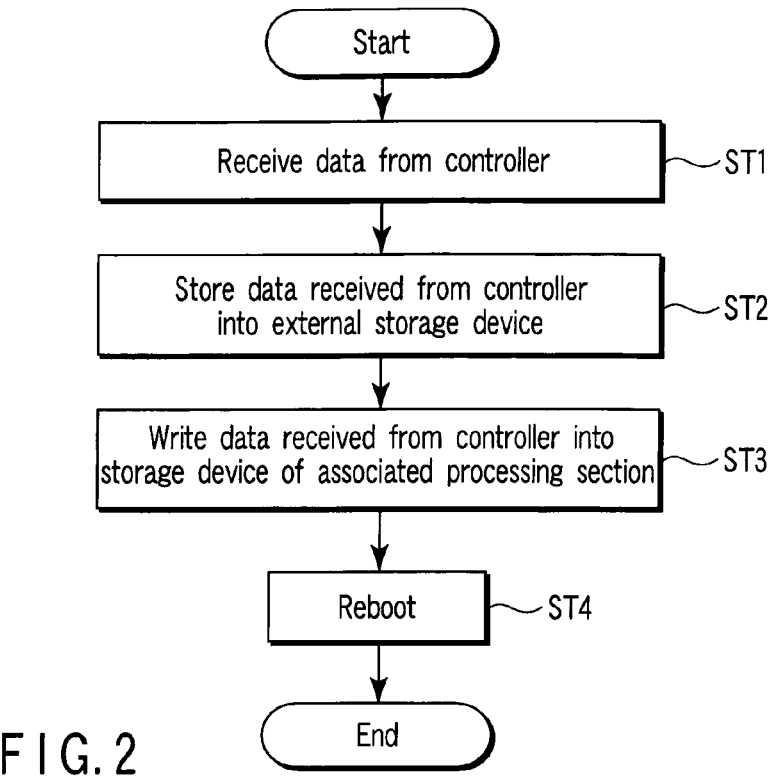
FIG. 2 is a flow chart illustrating an operation when data overwrite is requested.

An embodiment of the present invention will now be described with reference to the accompanying drawings.

FIG. 1 schematically shows the structure of an image forming apparatus according to the present invention. An image forming apparatus 20 comprises a system processing section 2, a scan processing section 4 and a print processing section 6. A controller 1 is connected to the image forming apparatus 20 via an interface (I/F) 13. In addition, an option processing section 9 is connected to the image forming apparatus 20.

The controller 1 is connected to a Web site 12 that provides data via the Internet 14. As will be described later in detail, the controller 1 acquires data from the Web site 12 that provides data.

The system processing section 2 includes a storage device 3 comprising a non-volatile memory. An external storage device 8 is connected to the system processing section 2. The system processing section 2 controls the entirety of the apparatus. The external storage device 8 is, for instance, a hard disk drive. The external storage device 8 prestores, at the time of shipment, a table containing basic data and version information thereof.

The scan processing section 4 includes a storage device 5 comprising a non-volatile memory and performs an operational process for a scanner (not shown).

The print processing section 6 includes a storage device 7 comprising a non-volatile memory and performs an operational process for a printer (not shown).

The option processing section 9 performs operational processes for a finisher processing section 10 that includes a storage device 11 comprising a non-volatile memory, and an automatic document feeder (ADF) (not shown).

Normally, when data overwrite for the image forming apparatus 20 is performed, the controller 1 acquires data from the Web site 12 that provides data via the Internet 14. The controller 1 transmits the acquired data to the image forming apparatus 20 via the interface (I/F) 13.

With the above-described structure, the operation of the image forming apparatus 20 at the time when data overwrite is requested is described with reference to a flow chart of FIG. 2.

When a request for data overwrite is issued from the controller 1, the system processing section 2 of the image forming apparatus 20 receives data (ST1).

The system processing section 2 stores the received data, along with version information of the data, in the external storage device 8 (ST2).

The system processing section 2 writes the received data into the storage device (3, 5, 7, 11) of the associated processing section (ST3).

The system processing section 2 executes reboot and finishes the process (ST4).

Figure 3:
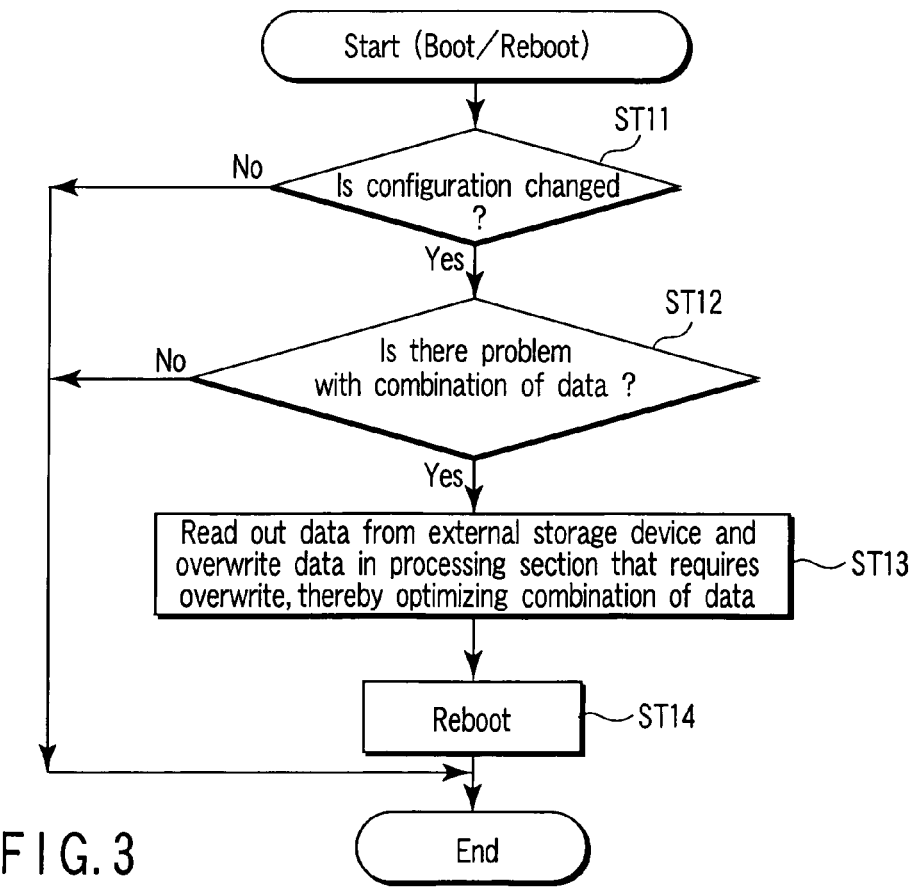

Next, referring to a flow chart of FIG. 3, a description is given of a reboot operation immediately after the controller 1 executes overwrite of specific data in the image forming apparatus 20, or a boot operation immediately after power to the image forming apparatus 20 is turned on.

At the time of start of the reboot operation or boot operation of the image forming apparatus 20, the system processing section 2 confirms whether the configuration of the option processing section 9 has changed (e.g. addition of an option device), and whether data in the storage device 3, 5, 7, 11 in each processing section has changed (e.g. overwrite) (ST11). If there is no change in step ST11, the system processing section 2 finishes the confirming process.

If there is a change in step ST11, the system processing section 2 confirms whether there is a problem with the combination of data in the current configuration, for example, disability of normal activation of the apparatus (ST12). If there is no problem in step ST12, the system processing section 2 finishes the confirming process.

If there is a problem in step ST12, the system processing section 2 overwrites the data in the storage devices 3, 5, 7, 11 in the respective processing sections by using the data stored in the external storage device 8, thereby to realize a latest, optimal combination of data in the current configuration (ST13). Thus, the system processing section 2 prevents occurrence of problems.

The system processing section 2 then executes reboot and finishes the process (ST14).

As regards the determination of whether the data combination is latest and optimal, when overwrite data is received from the controller 1 at the time of data overwrite, data (version information, etc.) indicative of the data combination is also received at the same time and stored in the external storage device 8. The system processing section 2 refers to the data indicative of the data combination, thereby executing the determination of whether the data combination is latest and optimal.

The controller 1 also acquires the data indicative of the data combination from the Web site 12 that provides data via the Internet 14.

Normally, each processing section is activated by referring to data stored in the storage device thereof. There are cases, however, where an error occurs due to a problem with a combination of data in the respective processing sections and the image forming apparatus cannot normally be operated. The present invention aims at preventing this.

This invention is also applicable to reboot and boot operations in case of, e.g. failure of data overwrite and disruption of power during data overwrite.

As has been described above, according to the embodiment of the present invention, when the image forming apparatus cannot normally be activated due to failure of data overwrite or disruption of power during data overwrite, the image forming apparatus itself executes data overwrite in the storage device that cannot normally be started up, with use of data for the storage device stored in the external storage device. Thereby, an optimal data combination is realized, and the apparatus can normally be activated.

As regards the option processing section of the image forming apparatus, there is a case where mismatching occurs when an option device different from a currently connected option device is connected and power is turned on once again. In such a case, the image forming apparatus itself executes data overwrite in the storage device, with which mismatching has occurred, with use of data for the storage device stored in the external storage device. Thereby, an optimal data combination is realized, mismatching is eliminated, and the apparatus can normally be activated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
   a plurality of processing sections that include storage devices storing data associated with the respective processing sections, and execute controls based on the data stored in the storage devices;
   a storage section that stores basic data, which is an original combination of the data stored in the storage devices;
   a receiving section that receives overwrite data from outside;
   a first control section that executes a control to store the overwrite data received by the receiving section in the storage section;

an overwrite section that overwrites the data in the storage device of the associated processing section, using the overwrite data received by the receiving section;

a confirming section that confirms whether the image forming apparatus is operable with a combination of the data stored in the storage devices immediately after the overwrite section overwrites the data or immediately after power to the apparatus is turned on; and a second control section that executes, when the confirming section confirms that the image forming apparatus is not operable, a control to overwrite the data in the storage devices on the basis of a latest optimal combination of the basic data and overwrite data stored in the storage section.

2. The image forming apparatus according to claim 1, wherein said plurality of processing sections are a system processing section, a scan processing section, a print processing section and an option processing section.

3. The image forming apparatus according to claim 1, wherein the storage section is a hard disk drive containing a table that stores the basic data and overwrite data.

4. The image forming apparatus according to claim 1, wherein the storage device is a non-volatile memory.

5. The image forming apparatus according to claim 1, wherein the receiving section is a controller that acquires the overwrite data from a Web site via the Internet.

6. The image forming apparatus according to claim 1, wherein the receiving section is a controller that acquires the overwrite data along with version information of the overwrite data from a Web site via the Internet.

7. The image forming apparatus according to claim 1, wherein the overwrite section is a system processing section that executes a control of the entirety of the image forming apparatus.

8. The image forming apparatus according to claim 1, wherein the confirming section confirms whether an option device, which is added to the image forming apparatus, operates.

9. The image forming apparatus according to claim 1, wherein the storage section stores version data indicating a combination of data that do not cause any problem together with the overwrite data, and wherein the version data is referred to in determining the latest, optimal combination of data.

10. An image forming apparatus comprising:

system processing means, including a storage device storing data, for controlling an entirety of the image forming apparatus on the basis of the data stored in the storage device thereof;

scanner processing means, including a storage device storing data, for controlling a scanner operation in the image forming apparatus on the basis of the data stored in the storage device thereof;

print processing means, including a storage device storing data, for controlling a printer operation in the image forming apparatus on the basis of the data stored in the storage device thereof;

option processing means, including a storage device storing data, for controlling an option operation of an option device, which is added to the image forming apparatus, on the basis of the data stored in the storage device thereof;

storage means for storing basic data which is an original combination of the data stored in the storage devices;

receiving means for receiving overwrite data from outside;

first control means for executing a control to store the overwrite data received by the receiving means in the storage means;

overwrite means for overwriting the data in the storage device of the associated processing means, using the overwrite data received by the receiving means;

confirming means for confirming whether the image forming apparatus is operable with a combination of the data stored in the storage devices immediately after the overwrite means overwrites the data or immediately after power to the apparatus is turned on; and second control means for executing, when the confirming means confirms that the image forming apparatus is not operable, a control to overwrite the data in the storage devices on the basis of a latest optimal combination of the basic data and overwrite data stored in the storage means.

11. The image forming apparatus according to claim 10, wherein the storage means stores version data indicating a combination of data that do not cause any problem together with the overwrite data, and wherein the version data is referred to in determining the latest, optimal combination of data.

12. A data overwriting method for an image forming apparatus comprising:

controlling respective processing sections, which form the image forming apparatus, on the basis of data stored in storage devices associated with the respective processing sections;

storing basic data which is an original combination of the data stored in the storage devices, into an external storage device;

executing, when overwrite data is received from outside, a control to store the received overwrite data in the external storage device;

overwriting the data in the associated storage device, using the received overwrite data;

confirming whether the image forming apparatus is operable with a combination of the data stored in the storage devices immediately after the data is overwritten or immediately after power to the apparatus is turned on; and executing, when it is confirmed that the image forming apparatus is not operable, a control to overwrite the data in the storage devices on the basis of a latest optimal combination of the basic data and overwrite data stored in the external storage device.

13. The method according to claim 12, wherein the storage step stores version data indicating a combination of data that do not cause any problem together with the overwrite data, and wherein the version data is referred to in determining the latest, optimal combination of data.

* * * * *